United States Patent [19]

TenEyck

[11] 4,435,468
[45] Mar. 6, 1984

[54] SEAMLESS CERAMIC FIBER COMPOSITE ARTICLES AND METHOD AND APPARATUS FOR THEIR PRODUCTION

[75] Inventor: John D. TenEyck, Lewiston, N.Y.

[73] Assignee: Kennecott Corp., Cleveland, Ohio

[21] Appl. No.: 348,482

[22] Filed: Feb. 12, 1982

[51] Int. Cl.³ .......................... B32B 5/22; E04B 1/00
[52] U.S. Cl. ...................................... 428/285; 52/270; 52/506; 428/212; 428/284; 428/299
[58] Field of Search .................. 501/95; 428/212, 298, 428/299, 284, 285, 446; 52/270, 699, 506

[56] References Cited

U.S. PATENT DOCUMENTS

| | | |
|---|---|---|
| 1,345,377 | 7/1920 | Linbarger . |
| 1,477,288 | 12/1923 | Shaw . |
| 1,532,084 | 3/1925 | Shaw . |
| 1,924,573 | 8/1933 | Schur . |
| 2,098,733 | 11/1937 | Sale . |
| 2,348,829 | 5/1944 | MacArthur et al. . |
| 2,765,247 | 10/1956 | Graham . |
| 3,220,915 | 11/1965 | Shannon . |
| 3,493,463 | 2/1970 | Baker . |
| 3,598,696 | 8/1971 | Beck . |
| 3,819,468 | 6/1974 | Sauder et al. ........................ 428/99 |
| 3,988,183 | 10/1976 | Senn . |
| 3,996,325 | 12/1976 | Megraw . |
| 4,018,646 | 4/1977 | Ruffo et al. ........................ 428/298 |
| 4,032,394 | 6/1977 | Back . |
| 4,123,886 | 11/1978 | Byrd, Jr. ............................ 428/285 |
| 4,152,494 | 5/1979 | Wang . |
| 4,201,247 | 5/1980 | Shannon ........................ 138/149 X |
| 4,203,255 | 5/1980 | Nasland et al. . |
| 4,239,591 | 12/1980 | Blake . |
| 4,250,220 | 2/1981 | Schlatter et al. . |
| 4,269,887 | 5/1981 | Sonobe et al. ................ 428/299 X |

Primary Examiner—Lorraine T. Kendell
Attorney, Agent, or Firm—Paul A. Leipold; D. M. Ronyak

[57] ABSTRACT

The invention relates to a ceramic fiber felt or mat having an area comprising a high temperature ceramic fiber and another portion of lower temperature ceramic fiber. The two portions being joined seamlessly by an intermingling and intimate relationship of the two fiber types during the formation process. The invention further provides apparatus for formation of such ceramic fiber composites and further provides for forming such composite ceramic fiber members into modules.

9 Claims, 7 Drawing Figures

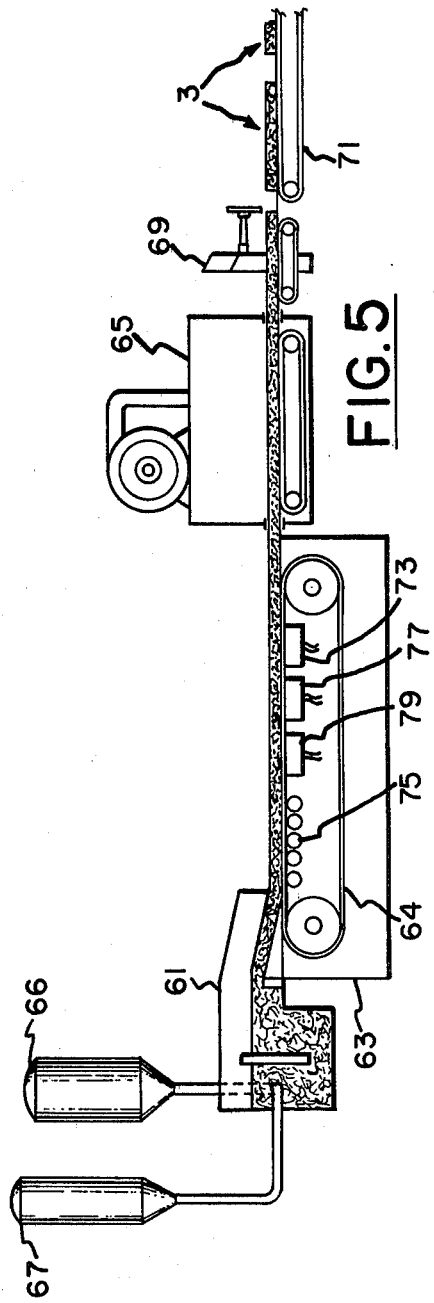
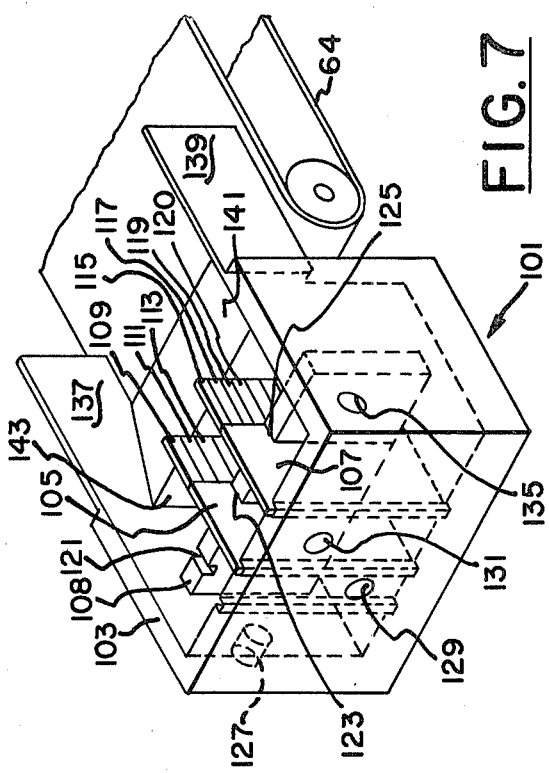

4,435,468

SEAMLESS CERAMIC FIBER COMPOSITE ARTICLES AND METHOD AND APPARATUS FOR THEIR PRODUCTION

TECHNICAL FIELD

The present invention relates to a composite ceramic fiber article and the method and apparatus for its production. It more particularly relates to formation of a ceramic fiber module in which the hot face presents a high temperature resistant fiber while below the hot face the fiber is a lower temperature resistant fiber with the higher and lower temperature resistant fibers being joined in an area of intimate comingling of the fibers.

BACKGROUND ART

The utilization of ceramic fibers for insulation of high temperature furnaces has been practiced in several methods. In one method, sheets of ceramic fiber are attached to the wall much in the manner of layered wallpaper. It is known in such constructions to utilize lower temperature resistant ceramic fibers toward the cold face of the shell of the furnace with higher temperature resistant fibers forming the layers on the hot face. This system has disadvantages in that it is difficult to install and requires numerous studs which must be carefully positioned and themselves must be temperature resistant. Further, the studs conduct heat to the cold face thereby decreasing the efficiency of the insulation.

It has also been practiced to utilize modules of ceramic fiber which are installed as units with the fibers of the modules arranged such that most of the fibers in the ceramic fiber mats lay in places generally perpendicular to the wall. U.S. Pat. No. 3,819,468 to Sauder illustrates such a module system. These module systems may be installed by screwing, bolting or welding the modules to the furnace shell. The modules have enjoyed success because of the ease of installation, efficiency of the heat insulation and ease of replacement of damaged modules. However, the edge grain module system has suffered from the disadvantage that only one type of ceramic fiber may be utilized in a module. Therefore, expensive high temperature ceramic fibers must be utilized to form the entire module whereas the fibers near the cold face are exposed to temperatures much lower than their maximum use temperature.

There also have been developed very high temperature ceramic fibers formed by solution gelling techniques which are commonly referred to as polycrystalline fibers. Such fibers are illustrated by U.S. Pat. Nos. 3,996,145 to Hepburn, 3,322,865 to Blaze, Jr., 4,277,269 to Sweeting and 4,159,205 to Miyahara. These polycrystalline fibers have a working temperature up to about 3000° F. However, these fibers are very expensive and expense has limited their use. It also has been a practice in the industry to blend the polycrystalline fibers with lower temperature ceramic fibers to create a higher temperature resistant material with better strength properties and also higher temperature resistance.

It has been proposed to utilize polycrystalline very high temperature fibers in modules. Such modules are ordinarily only about 3 inches in thickness and are cemented over hard refractories or cemented to ceramic fiber modules. Such installation techniques are expensive in use of fiber and further are subject to failure as the cement bond between the hard refractory and the fibers or between the two types of fiber is subject to failure upon cycling of the furnaces and further is very dependent upon high quality, careful installation.

Modules of composite construction have been proposed. Such modules have a lower temperature fiber forming the interior of a cushion-like block. The outer covering of the cushion being a higher temperature ceramic fiber material. However, it is not believed that polycrystalline ceramic fiber insulating materials have been successfully used in such constructions as mats of polycrystalline fibers have been too weak when used as a surface covering. They have lacked both strength and abrasion resistance to articles in the furnace and even strong air currents in furnaces. Polycrystalline fiber structures of sufficient strength and abrasion resistance have been too rigid to be bent around the sides of the cushion and be compressed during installation. Modules formed of rigid board material are difficult to install without leaving gaps. Further, modules of a construction using several different types of fiber have been found to be expensive in labor costs for construction and in materials costs for fastening of the various elements of the composite together.

Therefore, there remains a need for a system of presenting the very high temperature resistent fibers to the hot face of a furnace wall using only the minimum amount of these fibers at the hot face. Further, there remains a need for such a system that will allow utilization in module constuction or in other constructions which place the edge grain of the module towards the hot face with the fibers of the mat laying generally perpendicular to the wall or ceiling of the furnace. There is a further need for a commercially feasible system of providing insulation to furnaces operating with hot face temperatures of about 3000° F.

DISCLOSURE OF THE INVENTION

An object of this invention is to overcome disadvantages of prior systems of ceramic fiber insulation.

A further object of this invention is to provide lower cost high temperature insulation.

Another object of this invention is to provide an improved system of insulation of furnaces with ceramic fiber.

An additional object of this invention is to provide a very high temperature insulation system with ease of installation.

Another further additional object of this invention is to provide a system of high insulation value and low weight for high temperature furnaces.

Another further object of this invention is to provide a system of insulation of furnaces having a fast cycle time.

An additional further object of this invention is to provide furnace insulation equal in performance to polycrystalline fiber insulation but at fractional cost of polycrystalline fiber insulation in present use.

These and other objects of the invention are generally accomplished by providing a planar ceramic fiber felt or mat having a planar area or portion comprising high temperature resistant ceramic fiber and another planar area or portion of lower temperature resistant ceramic fiber.

In a particularly preferred system of the invention, a mat is formed with an outer edge portion of polycrystalline ceramic fiber blended with vitreous alumino-silicate ceramic fiber and this is intimately joined by an edge face to an edge face of a portion of only vitreous alumino-silicate ceramic fiber. These pieces are then joined into a module with the edge face or edge grain of the higher temperature resistant polycrystalline fiber containing portion exposed to the hot face and the lower temperature resistant nitreous ceramic fiber portion at the cold face.

BRIEF DESCRIPTION OF THE DRAWINGS

FIG. 5 is a diagramatic sectional side elevation of continuous apparatus for production of ceramic fiber members in accordance with the invention.

FIG. 6 is a perspective view of the forming section of the continuous apparatus for formation of members in accordance with the invention.

FIG. 7 is a perspective view of alternate apparatus for continuous formation of fiber members in accordance with the inventive system.

BEST MODE FOR CARRYING OUT THE INVENTION

The system of the instant invention provides numerous advantages over prior ceramic insulation systems. The cost of polycrystalline fibers is about 16 times the cost of the conventional high temperature vitreous alumino-silicate ceramic fibers. The invention creates the possibility of taking advantage of the high temperature resistance of polycrystalline fibers at the very thin hot face where they are needed without the unnecessary use of these fibers at areas of lesser temperature. By allowing the use of polycrystalline fibers in systems where edge graining is used, the heat transfer caused by stud insulation is eliminated. The elimination of studs at the hot face further has the advantage that the problem of thermal shock cracking and high temperature creep of the studs is eliminated. The difficulties of gluing and cementing thin layers of polycrystalline fibers which then may become detached under high temperature use is eliminated. Further, the system of the invention provides a low-cost forming method which does not require skilled labor for either formation of the ceramic fiber members, the modules or for installation. Another advantage is that the invention allows the variation of use of high temperature materials to meet specific needs of each user of ceramic fiber insulation. These and other numerous advantages of the instant system of ceramic fiber articles, formation methods and apparatus for formation of ceramic fiber members, will become apparent from the detailed description below.

Figure 1:
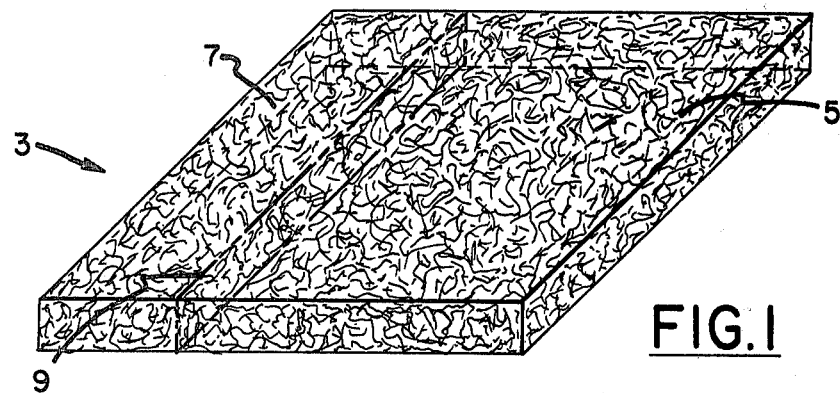
FIG. 1 is a perspective view of a composite ceramic fiber mat in accordance with the invention.

FIG. 1 generally shows a composite ceramic fiber member 3. Fiber member 3 is formed of two portions of differing ceramic fiber composition. Portion 5 is of one composition while portion 7 is of another. Ordinarilly the smaller portion 7 would be of higher temperature more expensive fiber. The area of joinder 9 is not a seam, but an area of intimate comingling and merging joinder of the two ceramic fiber compositions of area 7 and area 5.

Figures 2, 3:
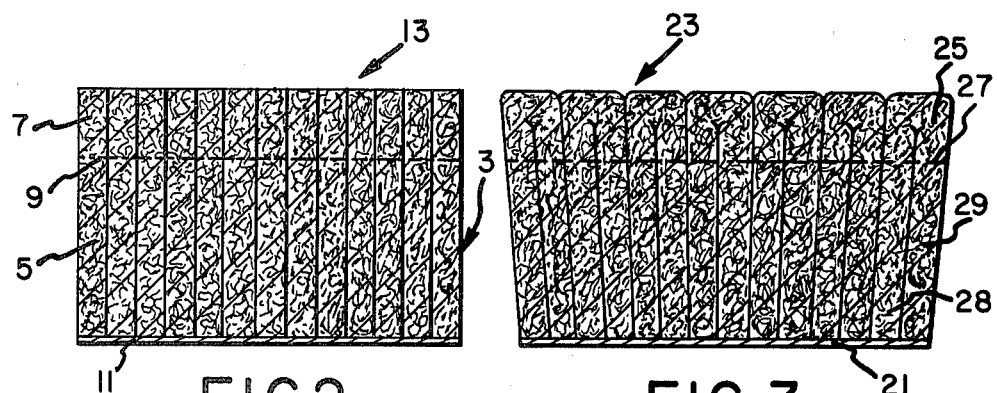
FIG. 2 is a cross-sectional view of a ceramic fiber module composed of edge grained pieces of the composite ceramic fiber product of the invention.
FIG. 3 is the cross-section of a folded module utilizing the composite insulating members of the invention.

FIG. 2 illustrates a module formed of a multiplicity of fiber members such as 3. The module 13 is formed of a multiplicity of fiber members joined to backing plate 11. Such backing plates ordinarily are expanded metal to which the fibers are cemented. Module 13 may be attached to the furnace by the conventional screwing or welding which is carried out by insertion of a screwing or welding device in the conventional manner between the fiber mats.

FIG. 3 is a folded module of the invention generally indicated as 23 which is composed of folded sheets of composite construction. Each sheet prior to folding has a center portion 25 of high temperature fiber and two edge portions 28 and 29 of lower temperature resistant fiber which after folding become the material towards the cold face while the folded center portion is the hot face.

Figure 4:
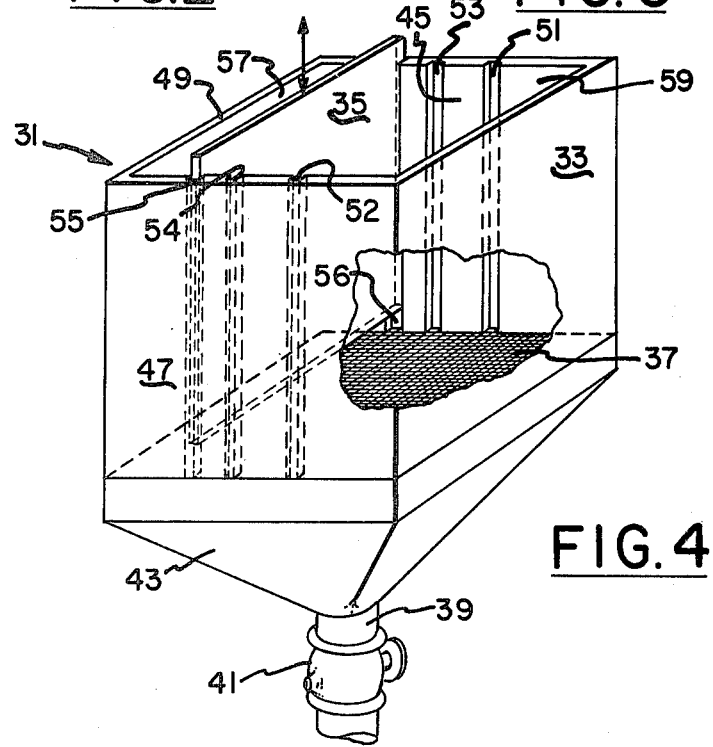
FIG. 4 is a perspective view of apparatus for batch formation of ceramic fiber members in accordance with the invention.

In FIG. 4 is indicated a batch process device 31 for formation of the seamless comingled boundary composite fibrous materials of the invention. The device comprises a generally rectangular member having four vertical sides 33, 45, 47 and 49. The device futher comprises a divider or weir member 35 that is adapted to slide in tracks 55 and 56. Divider or weir member 35 may be held in place at any desired position by wedges or clamps, not shown. Side members 45 and 47 further have tracks in which weir 35 may be placed for varying the structure of the sheet form. Further, it is possible that other weir members, not shown, could be placed in these tracks which are identified as 53 and 54 for one set and 51 and 52 for the other pair of tracks in which a weir member may be fitted. In the bottom of the generally rectangular member formed by sides 45, 33, 47 and 49 is placed a foraminous member such as screen 37. Below the screen 37 is a generally funnel shaped means 43 through which water flowing from stock material placed in the device is trapped and removed through pipe 39 and valve 41. The stock material is a liquid suspension or slurry of ceramic fiber, binder and additives such as fillers and colorants. Ordinarily there would be a suction or vacuum applied to pipe 39 so as to aid in drawing of water from stock material upon the screen 37. In use, high temperature resistant fiber in a liquid stock material is placed into the smaller compartment 57 formed between side 49 and weir member 35. A lower temperature resistant fiber in liquid suspension is placed into compartment 59 between weir member 35 and side 33. A vacuum is applied through pipe 39 after valve 41 is opened. The vacuum could be applied by means, not shown, such as vacuum pump or a water column. Weir member 35 is raised after addition of the stock material to a pre-determined level which gives the desired intermingling of fibers at the boundary member to create a strong seamless construction. The predetermined level normally is arrived at by trial and error and is dependent on variables such as the viscosity of the stock systems, thickness of the piece being formed and suction applied to the system. Generally, it has been found that creating a 2 inch spacing between the bottom of the weir 35 and foraminous member 37 is satisfactory when a member of about 1 inch thickness is formed. It is possible to vary the amount of high temperature fiber portion of the finished article by placing the weir in grooves 53, 54 or 51, 52. Further, it would be possible to make a composite structure of three parts, each joined without a seam by comingling of the fibers during formation by placing another weir, not shown, into grooves 51, 52 and placing a different stock material into the resultant cavity between the two weir members.

It is possible to form composite members of three or more compositions or with a different center portion than at the edges by utilization of the system of the invention as above described. By this method, various different fibers or blends of different fibers may be arranged with the most temperature resistant fibers on the hot face and less temperature resistant fibers being utilized in the same structure on the cold face side. The great savings is in utilization of a minimum amount of the very high temperature resistant polycrystalline fibers which may sell for about $16.00 per pound in comparison with high temperature alumino-silicate ceramic fibers of vitreous glassy construction which sell for less than $1.00 per pound. The substitution of mineral wool fibers for vitreous ceramic fibers in the invention system is only a savings of about $0.50 per pound, whereas as can be seen, the substitution of ceramic fibers for a unitary poly crystalline fiber article may be about a 16 fold savings in the substitution. However, the invention contemplates any type of higher and lower temperature resistant fiber combination even though the savings may be less.

Another particular advantage of the instant invention is the modules may be designed to be specifically suited for the conditions of use at lowest cost. Knowning the hot face temperature to which the module will be subjected a particular thickness of module and thickness of polycrystalline or other high temperature material at the hot face may be designed. In one instance where the hot face would be exposed to about 2400° F. a module of total 8" thickness with a 3" hot face thickness of a blend of 50% by weight polycrystalline alumina fibers having an alumina to silica ratio of greater than two (2) parts alumina to one (1) part silica and 50% by weight vitreous alumino-silicate conventional ceramic fibers having an alumina to silica ratio of about 1 with the 5" thickness area toward the cold face of conventional vitreous high temperature alumino-silicate fibers. In the instance where the hot face would be exposed to temperatures of about 2900° F. a module could be designed with a 4" thickness hot face of 60% by weight polycrystalline alumina fibers blended with 40% by weight vitreous alumino-silicate vitreous fibers. The cold face would then be between 6" and 7" of conventional high temperature vitreous almino-silicate ceramic fibers. In each of the above modules the cold face temperature would be about 250° F. As can be seen, the ability to blend the minimum amount of expensive polycrystalline fiber necessary to make the hot face portion allows the formation of engineered modules which can most efficiently meet the temperature demands of a particular use.

FIG. 5 illustrates a continuous production process for the seamless, comingled joint composite members of the invention. In the continuous process, two different stock materials are supplied from supply means 66 and 67 to separate compartments of the stock head box 61 for feeding to the fourdrinier machine 63. The fourdrinier machine 63 comprises table rollers 75 where water may flow between the rollers 75 after the stock material is placed onto the foraminous belt member 64. Then the belt causes the stock material now at least partially solidified into a fibrous mass to pass over suction boxes 77, 79 and 73. It is understood that the particular construction of the fourdrinier machine may vary with more or less suction boxes and other changes known in the paper making art for such machines. After passing over the fourdrinier machine, the wet fibrous mass passes into a dryer 65 where a flow of heated air further dries the mass and cures the low temperature binder. After the dryer, the material is cut into whatever size is desired by cutting devices represented at 69 and then carried by conveyor such as 71 to packing or formation into desired products such as modules.

While the invention has been described utilizing a continuous former fourdrinier machine, it is also possible and within the scope of the invention to utilize other paper forming machines such as rotoformers, vetical formers and cylinders. While illustrated with a fourdrinier machine, it is understood that the concept of the invention in which separate fibrous masses are brought together immediately prior to the dewatering section of a paper forming machine is applicable to any of the known paper making machines or other devices for formation of slabs, boards or sheets of fibrous material.

FIG. 6 is a detailed representation of a stock box 61 and the fourdrinier belt 64 wherein the seamless composites having an intermingled fiber joint are formed. The stock box 61 is generally divided into two compartments 81 and 83 which are separated by weir member 85. The stock material flows into the stock box through pipes 87 and 89 from mixing and storage means not shown. Ordinarily the material entering side 81 would be a higher temperature resistant fiber which would be more expensive and used in smaller proportions only at the hot face. A lower temperature ceramic fiber stock material would enter side 83 through piping 89. The stock material after entering the box passes under member 91 and rises up and over a threshold and is delivered to a sloped apron or ramp leading to the fourdrinier machine belt 64. It is noted that the two materials join at point 93. The depth of the area 93 of comingling prior to going over the threshold and down the sloped inclined may be varied to achieve good strength of the joined area with low wastage of the more expensive high temperature fibers.

FIG. 7 illustrates an alternative stock box construction generally indicated as 101. In this construction, a greater variance of construction of the finished member is allowed as the weir members are adjustable to a greater range. In the construction of 101, the box 103 may be divided into various configurations by the use of the three grooves and anywhere from one to three weir members. Shown are two weir members 105 and 107 resting on divider member 108 which has three grooves 121, 123 and 125. Weir or separator members 105 and 107 are provided with adjustable devices to allow control of the blending of the stock materials at their point of joinder. These devices are insertable blocks 109, 111 and 113 for separator 105 and 115, 117, 119 and 120 for separator 107. By removal and insertion of these devices the width of the area of comingled fibers may be regulated to provide good strength and minimum wastage of fibers at the joined area. Box 101 is provided with four inlets for feeding stock materials into the entry are behind divider 108. These are 127, 129, 131 and 135. Side members 137 and 139 control the flow of the material down incline 144 after it passes over threshold 143. The angle of incline 141 and the heighth of threshold 143 may be formed to be adjustable as another way of controlling the area of blending and also the thickness of the stock material delivered to fourdrinier belt 64.

The vitreous ceramic fibers and polycrystalline ceramic fibers utilized in the instant process may be any fibers or combination of fibers which give the desired temperature resistance. As used in the instant specification, temperature resistance is in reference to the use temperature at which fibers may be in continous service in a furnace. A greater temperature fiber is useful at a higher temperature than a lower temperature resistant fiber. As has been above stated, any combination of fibers giving the desired use temperature of the completed composite structure is suitable. Among fibers which typically may be utilized in the instant invention are the polycrystalline fibers which have use temperatures up to about 3000° F., mineral wool used up to about 1500° F., basalt ceramic fibers utilized up to about 2000° F., fiberglass utilized up to 1000 to 1250° F. and high temperature polymer fibers such as polyimides. The polycrystalline fibers are generally formed by chemical ceramic techniques from sols and comprise very pure polycrystalline alumina, polycrystalline alumino-silicates; such as those of U.S. Pat. Nos. 4,277,269 to Sweeting and 4,159,205 to Miyahara or polycrystalline zirconia fibers. Vitreous alumino-silicate ceramic fibers may be utilized at temperatures up to 2400° F. A preferred structure is a blend of high alumina polycrystalline fibers and vitreous alumino-silicate ceramic fibers at the hot face and 100% vitreous ceramic fiber of a chemical composition about a 50% alumina and 50% silicate forming the cold face material. A preferred blend of polycrystalline fiber and vitreous ceramic fiber is about 50% by weight of the poly crystalline high alumina fiber with 50% by weight of the vitreous 50—50 alumina-silica fiber to give a very high use temperature up to about 2700° F. with good strength and abrasion resistance. This hot face material at about 3" depth with about 7" of vitreous alumino-silicate ceramic fibers has a hot face use temperature of about 2700° F. and a cold face temperature of below about 250° F.

Ceramic fiber articles generally are formed with binders for strength at least at low temperatures. Any binder which provides satisfactory strength for installation into the furnace is suitable. Typical of such binders are thermosetting resins which as phenolics, melamines, ureas and refractory binders such as colloidal silica and alumina. A preferred binder is thermoplastic latex as this material is easy to form in the aqueous systems and provides good strength to the material prior to heating. It is generally preferred that the same binder system be utilized for both the hot face and cold face materials as this normally leads to a stronger joint. However, differing binders may be utilized if strength is satisfactory.

The ratio of blends of the polycrystalline fiber with vitreous ceramic fibers may be any which gives the desired temperature resistant and abrasion resistant properties. A preferred range is more than 40% polycrystalline fibers for low shrinkage, high temperature resistance and good strength. The raising of the polycrystalline fiber content will lower shrinkage and also raise the temperature resistance of the blend.

The thickness of the outer layer of high temperature fiber may be any thickness which provides enough insulation for the cold face material to stay at below its safe operating temperature. In the case of vitreous alumino-silicate ceramic fibers, this safe operating temperature generally is about 2200° F. The total insulation thickness provided to a given furnace will be determined by the economics of each situation. However, it is believed that a preferred module will be about a total of about 8 to 12 inches thick with a hot face blended to withstand about 2600° F. which would require a blended area of about three inches depth of a 50—50 blend of polycrystalline fiber and conventional vitreous alumino-silicate fiber on the hot face and one hundred percent (100%) conventional vitreous alumino-silicate ceramic fiber provided in the cold face material.

The insulation of the invention may be utilized in several different forms of high temperature insulation in which edge graining is practiced. As mentioned above, the utilization in modules which are welded, screwed or glued to a backing material is one use. Further, it is known to stack edge grain batts of ceramic fiber material which may be held in place by rods passing through them or they may be impaled on L-shaped spikes which are welded to the furnace wall. Any of these mounting systems or other known systems are suitable for practice with the composite insulating ceramic fiber structures of the invention.

The density of the fibrous structure at both the hot face and the cold face may be any density which provides sufficient strength, insulation and flexibility. It has been found that a satisfactory hot face density is between 4 and 12 pounds per cubic foot. A preferred hot face density is between about 6 and about 8 pounds per cubic foot for high insulation value and the ability to compress for future expansion when some shrinkage takes place at use temperature. The cushiony or resilient property of the fiber is important as all ceramic fiber will shrink somewhat near use temperature and the resiliency and compression during installation allows the material to expand and fill any gap caused by shrinkage.

The interface between the hot face material and the cold face material or between different layers within the cold face material should be minimized to prevent waste but maintain physical integrity. Generally, a transition zone of intimate comingling of the fibers of between about $\frac{1}{4}$ inch and $\frac{1}{2}$ inch is satisfactory for production of a structure wherein the seamless joint has about 80% strength at the joint as at the portions of a single fiber. The area where the portions join has at least 50% of the strength of the weaker of the higher temperature resistant portion and the lower temperature resistant portion.

The thickness of the individual batts of the composite of the invention may be anything desired for the particular use. For ease of forming in wet systems, it is generally considered that a thickness of about 1 inch is preferred for ease of forming and also traditional use in the art. The overall length and depth of the cold and hot face may be anything suitable for the particular use.

The method of formation may be either batch or continuous as was set forth in the description of the drawings. Further depending on the width of the fourdrinier machines, the material may be formed with one joint or several joining portions which are later cut to form separate pieces for formation into modules. For instance, the stock box illustrated in FIG. 7 could be utilized to form a hot face portion in the middle between weir members 105 and 107 with cold face material on either side. This structure could either be folded to form a module as in FIG. 3 or could be cut down the middle to form two separate batts for formation into a module as in FIG. 2.

It is also considered a novel feature of this invention that the two different fiber materials may be colored to produce different colors for the different temperature properties. This is very important in keeping the hot face portion aligned correctly when the modules are formed. The material as it goes through the various handling steps may become disoriented if not identified by color coding. Further, the labor involved in module formation is not highly skilled and color coding allows easy training and quality control for consistent results.

While it is preferred that the colorant material be incorporated into the fibrous mass such that the color coding is available from any angle or when the material is cut or partially obscured it is also within the invention to color code in other manners particularly in the continous formation processes. It is within the invention to stripe the different composition materials while in the forming or drying stages to color code the materials immediately as they are formed when error should not take place. The striping could be done by spray painting or brushing the colorant onto the fiber as it passes through the dewatering and/or drying stages.

The following Example illustrates the formation of a typical composite article in accordance with the invention. Parts are by weight unless otherwise indicated. Temperatures are in Fahrenheit unless otherwise indicated.

A hot face stock is formed by mixing equal amounts by weight of Saffil polycrystalline alumina fibers, available from Imperial Chemical Industries, with an equal amount by weight of vitreous ceramic alumino-silicate fiber of a 50% alumina-50% silica composition. This is mixed in water to give about a 4% solids suspension of the fibers. A surfactant such as a sodium salt of alkyl naphthalene sulfonic acid was utilized to aid in formation of the suspension. After the suspension is formed 5% by weight of the dry fiber of thermoplastic latex emulsion of an acrylonitrile-butadiene was mixed in. Then an amount of about 5% by weight of the dry fiber of colloidal silica was mixed in. Then alum is mixed into the suspension. The alum is a coagulant and is added in an amount that causes the pH to drop to between about 4½ and 5. (Other coagulants that could be used include polyacrylomides, polyethyleneimides or ferric chloride.) The suspension is then diluted to about 0.25 to about 0.75% solids and is ready for pouring into the molding device. The feed stock for the cold face contains the same ingredients except that vitreous alumino-silicate ceramic fiber is substituted for the polycrystalline alumina fiber and that the colloidal silica is not utilized. Small additions of surfactants and/or viscosity modifiers can be added to make the drainage of the stocks about equal. These two stocks for the cold face and hot face are then poured into the appropriate sides of a molding device as shown in FIG. 4 while a vacuum is applied to the lower drain tube of about 1-2 psi. The composite article is removed from the screen and contains about 50% solids. It is then placed in a forced air dryer until dried. The drying includes heating to about 300° F. for between 1 and 5 minutes to polymerize the latex. (If a phenolic binder was used heating would need to be at least 375° F. to cure the phenolic resin.) The dry material contains less than 5% water by weight. This Example was repeated enough times to create a series of 1 inch thick slabs of about 8 by 12 with the 8 inch measurement along parallel to the joinder between the two sections. Individual batts were found to have a strength at the seamless joint area of intermingled fibers of at least 80% of the strength of the other sections.

Although, the foregoing describes presently preferred embodiments of the instant invention, it is understood that the invention may be practiced in still other forms within the scope of the following claims. For instance, combinations of vitreous alumino-silicate ceramic fiber at the hot face could be used with the cold face of mineral wool. Further, instead of hot air drying, dielectric or infrared could be utilized. Further, rather than the illustrated two-part modules those having sections of three or more different fibers could be utilized.

Further, the apparatus of the invention would find uses in other fibrous forming processes such as forming of wall board or paper. Such products also may have need of a unitary article which possesses different characteristics of strength, flame retardants or insulating properties. The apparatus herein disclosed would allow formation of such composite materials. Further, while the particular head box design is shown any head box design having a divided section for at least two feed stocks could be utilized. Further, while the invention has been described as involving formation of the composite article of the invention by depositing from water it is also within the invention to use dry formation techniques to simultaneously deposit fibers from two or more air streams onto a foraminous member. Depositing from an air stream would not require water drainage. These and other variations would be within the instant invention as described in the claims attached hereto.

What is claimed is:

1. A planar seamless composite fiber insulating mat comprising at least one planar lower temperature resistant portion having planar faces and edge faces, the lower temperature resistant portion comprising lower temperature resistant insulating fibers and at least one planar high temperature resistant portion having planar faces and edge faces, the higher temperature resistant portion comprising higher temperature resistant fibers, wherein an edge face of said lower temperature resistant portion is joined to an edge face of said higher temperature resistant portion by a transition zone of commingled fibers of said lower temperature resistant fiber and said higher temperature resistant fibers.

2. The mat of claim 1 wherein said portions are arranged edge face-to-edge face with the higher temperature resistant portion at one periphery and the lower temperature resistant portion at the opposite periphery.

3. The mat of claim 1 wherein said higher temperature resistant fiber comprises polycrystalline fibers.

4. The mat of claim 1 wherein said lower temperature resistant portion comprises vitreous alumino-silicate ceramic fibers.

5. The mat of claim 1 wherein said higher temperature resistant fiber comprises a mixture of polycrystalline ceramic fiber and vitreous alumino-silicate ceramic fiber.

6. The mat of claim 5 wherein said polycrystalline ceramic fiber comprises at least a 2:1 ratio of alumina to silica by weight.

7. The mat of claim 1 wherein said area where the portions join has at least about 50% of the strength of the weaker of said higher temperature resistant portion and said lower temperature resistant portion.

8. The mat of claim 1 wherein the different temperature resistant portions are also different colors.

9. The mat of claim 1 wherein said higher temperature resistant portion comprises a blend of polycrystalline fibers and vitreous alumino-silicate ceramic fibers and said lower temperature resistant portion comprises alumino-silicate ceramic fibers.

* * * * *